United States Patent
Schmidt et al.

(10) Patent No.: US 6,447,270 B1
(45) Date of Patent: Sep. 10, 2002

(54) BRUSHLESS COOLANT PUMP AND COOLING SYSTEM

(75) Inventors: Robert A. Schmidt, Lapeer, MI (US); Bruce A. Smetana, Colton; Thomas T. Weir, Pullman, both of WA (US)

(73) Assignees: Walbro Corporation, Cass City, MI (US); Isothermal Systems Research, Inc., Clarkston, WA (US)

( * ) Notice: Subject to any disclaimer, the term of this patent is extended or adjusted under 35 U.S.C. 154(b) by 0 days.

(21) Appl. No.: 09/397,359

(22) Filed: Sep. 16, 1999

Related U.S. Application Data

(60) Provisional application No. 60/100,760, filed on Sep. 17, 1998.

(51) Int. Cl.[7] .................................................. F04B 17/00
(52) U.S. Cl. ...................................... 417/366; 165/804
(58) Field of Search ................................ 417/366, 369, 417/410.4; 165/804, 908, 104.33; 361/699, 702

(56) References Cited

U.S. PATENT DOCUMENTS

| | | | |
|---|---|---|---|
| 5,035,588 A | | 7/1991 | Tuckey |
| 5,096,390 A | | 3/1992 | Sevrain et al. |
| 5,265,997 A | | 11/1993 | Tuckey |
| 5,349,831 A | * | 9/1994 | Daikoku et al. ............... 62/376 |
| 5,943,211 A | * | 8/1999 | Havey et al. ................ 361/699 |
| 5,961,293 A | * | 10/1999 | Clemmons et al. ......... 417/44.2 |
| 5,997,261 A | * | 12/1999 | Kershaw et al. ............ 417/366 |

* cited by examiner

*Primary Examiner*—Charles G. Freay
(74) *Attorney, Agent, or Firm*—Reising, Ethington, Barnes, Kisselle, Learman & McCulloch, P.C.

(57) ABSTRACT

A liquid pump with a brushless motor constructed to be received within a liquid reservoir of a cooling system to deliver liquid coolant under pressure to a manifold assembly through which the coolant is discharged onto various electronic components to cool them. The pump has a pumping assembly, a rotor, a stator and an electronic control circuit which controls the operation of the pump and each of which is immersed in liquid coolant in the pump housing to cool them as the coolant flows through the pump. Further, because each component within the pump can be exposed to the liquid in the pump, no sealed enclosures are needed for the pump as a whole or for any component therein and the pump can be received directly in the reservoir.

26 Claims, 3 Drawing Sheets

BRUSHLESS COOLANT PUMP AND COOLING SYSTEM

Reference to Co-pending Application

This application claims the benefit of U.S. Provisional Application Ser. No. 60/100,760 filed Sep. 17, 1998.

FIELD OF THE INVENTION

The present invention relates to fluid pumps and more particularly to a brushless pump for pumping a liquid in a cooling system.

Background of the Invention

Various electric motor driven fluid pump constructions are known including those generally referred to as gear rotor pumps, such as that disclosed in U.S. Pat. No. 5,035,588 and turbine vane type fluid pumps, such as that disclosed in U.S. Pat. No. 5,265,997. Typically, fluid pumps use electric motors with brushes wherein electrically conductive brushes are engaged with a commutator connected to windings to make an electrical connection therewith to generate a rotating magnetic field which spins a rotor to drive the pumping mechanism. The electromechanical connection between the brushes and the windings can provide a varied or intermittent contact therebetween which reduces the efficiency of the pump and may ultimately lead to failure of the pump, due to mechanical wear of the brushes.

A pump with a brushless electric motor such as that disclosed in U.S. Pat. No. 5,096,390, is also well known and may be used to pump a liquid in a coolant system. In this pump, an electronic controller or driver circuit controls the excitation of various stator windings to control the operation of the motor. This pump has a sealed enclosure separating the rotor from the stator windings and the electronic controller circuit to isolate the stator windings and the circuit from the liquid in the pump. Therefore, the motor stator and electronic controller circuitry are not directly cooled by the pumped fluid, and must be cooled by some conventional means such as conduction and/or air convection. This limits the power rating of the motor and electronic controller circuitry. In addition, the increased gap size between the rotor and the stator required to accommodate the seal cup reduces the efficiency of the motor. Further, the pump is not constructed to be disposed within a reservoir containing the liquid coolant and to do so requires a sealed housing enclosing the entire pump assembly which increases manufacturing and assembly costs. Mounting the pump exteriorly of the reservoir requires sealed connections between the pump and the reservoir and also increases the overall size of the cooling system.

Summary of the Invention

A brushless liquid pump constructed to be received within a liquid reservoir of a cooling system to deliver coolant under pressure to a manifold assembly through which the fluid is discharged onto various electronic components to cool them. The pump has a pumping assembly, a rotor, a stator and an electronic control circuit which controls the operation of the pump and each of which is immersed in liquid coolant in the pump to cool them as the coolant flows through the pump. This reduces the operating temperature of the pump enabling a higher power rating on the motor and controller circuitry which in turn permits a reduction in overall size of the pump per unit fluid power. Further, because each component within the pump can be exposed to the liquid in the pump, no sealed enclosures are needed for the coolant pump as a whole or for any component therein and the pump can be received directly in the reservoir.

In one embodiment, the brushless pump is constructed to be disposed within a reservoir containing the liquid coolant to deliver that coolant from the reservoir to a manifold assembly wherein the coolant is sprayed onto the object to be cooled. In another embodiment, the brushless coolant pumps are constructed to be disposed within a first manifold in a manifold assembly which directs the liquid coolant to at least one additional manifold downstream thereof to apply the liquid coolant to the object to be cooled.

Objects, features and advantages of this invention include providing a brushless coolant pump which can be disposed within a liquid reservoir, provides liquid cooling of both the pump motor and the electronic circuitry which drives the motor, reduces the operating temperature of the pump, improves the reliability of the pump, permits a reduction in the overall size of the pump per unit of fluid power, can be readily adapted to a manifold assembly to provide cooling of a plurality of objects, does not require any sealed enclosures or sealed connections, is of relatively simple design and economical manufacture and assembly, is compact, durable, reliable and has a long and useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
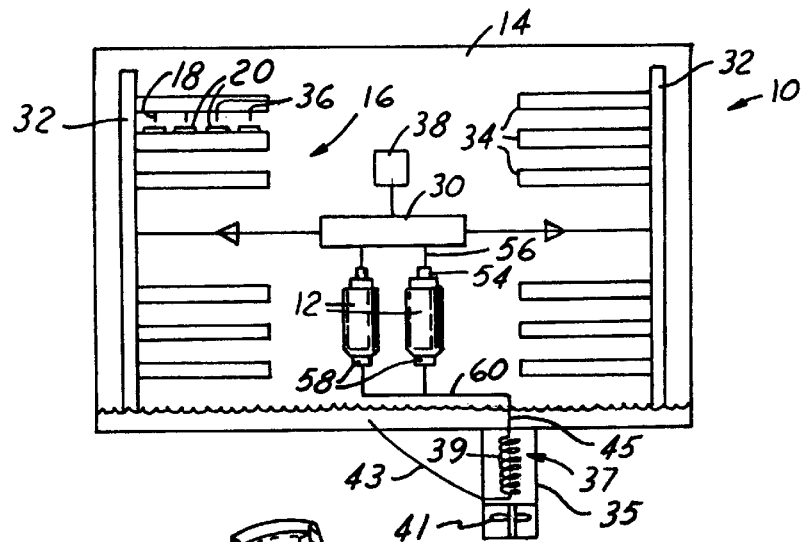
FIG. 1 is a schematic view of a cooling system having two brushless coolant pumps embodying the invention.
Figure 2:
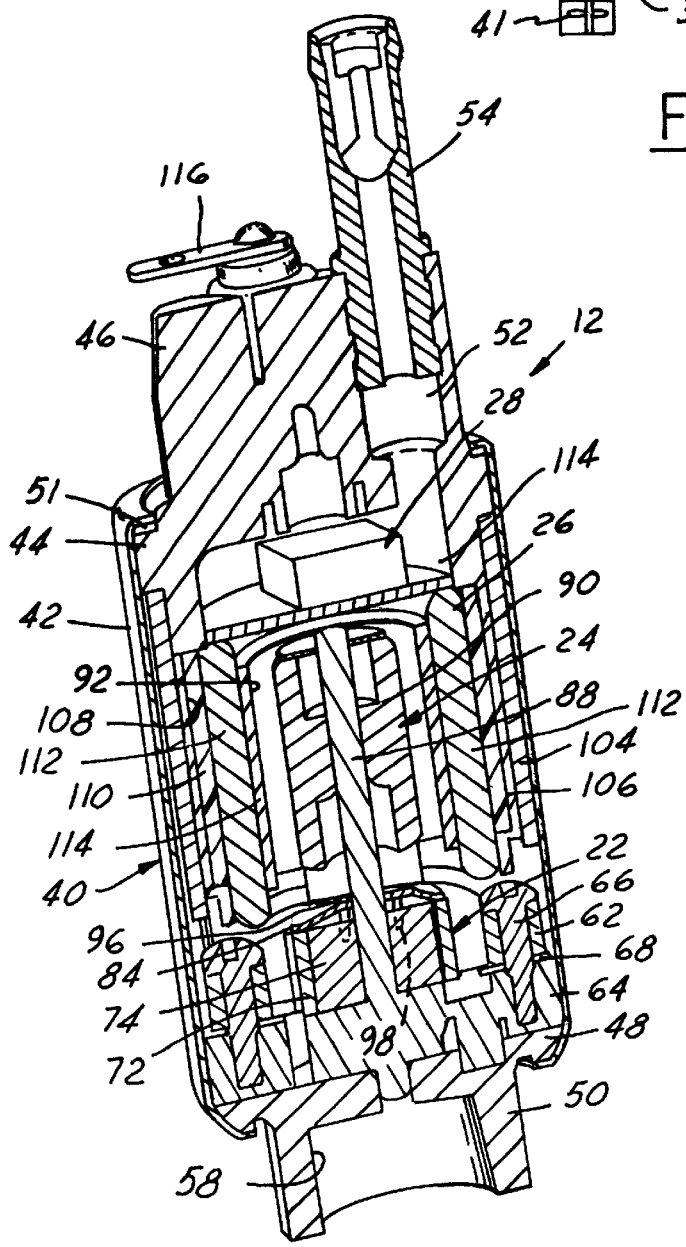
FIG. 2 is a cross sectional view of a coolant pump constructed to be mounted in a coolant reservoir.

Referring in more detail to the drawings, FIG. 1 shows a cooling system 10 which has a pair of brushless coolant pumps 12 received within a reservoir 14 containing a liquid coolant and constructed to deliver that coolant under pressure to a manifold assembly 16 through which the fluid is discharged through a plurality of openings or nozzles 18 onto a plurality of electronic components 20 to cool them. As shown in FIG. 2, each pump 12 has a pump assembly 22, a rotor assembly 24, a stator assembly 26 and an electronic control circuit 28 which controls the operation of the pump 12. Each of the components may be immersed in liquid which cools them in use and which enables the pump 12 to be disposed directly in the reservoir 14 without providing a sealed enclosure of the pump 12 as a whole or of any individual component.

The manifold assembly 16 has a first manifold 30 downstream of the pumps 12 and constructed to direct the coolant between a pair of supply manifolds 32. The supply manifolds 32 have an atomizer plate 34 in communication with each outlet of the supply manifold 32 and each atomizer plate 34 preferably has a plurality of outlets 36 each with a nozzle 18 to spray the liquid coolant onto the components 20. A pressure transducer 38 adjacent the first manifold 30 may be used to control the pressure of liquid coolant discharged from that manifold 30.

Figure 5:
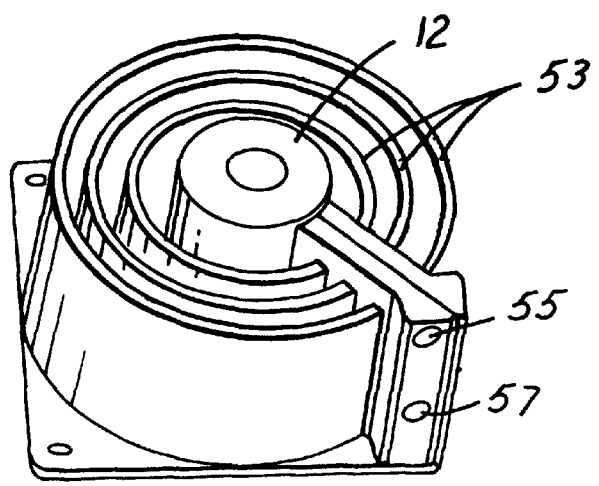
FIG. 5 is a perspective view of a coolant pump and heat exchanger unit pursuant to an alternate cooling system.

Each liquid pump 12 is preferably disposed in the reservoir 14. A tubular coil 39 and a fan 41 which directs a forced air current onto the coil are received within a shell 35 of a heat exchanger unit 37 disposed outside of the reservoir 14. The coil 39 has an inlet 43 in communication with the reservoir 14 and an outlet 45 in communication with the inlet of the pump 12 whereby the pump 12 draws coolant from the reservoir 14 through the coil 39. The coolant in the coil 39 is then drawn into the pump 12, pressurized by the pump 12 and then delivered to the manifold assembly 16 whereupon the coolant is sprayed onto the electronic components 20. Upon being sprayed onto the components 20, at least some of the liquid coolant vaporizes and any coolant which does not vaporize, collects in the reservoir 14. The vaporized coolant may condense in the liquid within the reservoir 14, on the walls of the enclosure 10, or within the heat exchanger unit 37. Condensation of the vaporized coolant is facilitated by the fan 41 which directs a forced air current onto the coil 39 to cool the coil 39 and dissipate some of the heat from the coil and the coolant therein. This provides a closed loop system to effectively recycle and reuse the liquid coolant even after at least some of the coolant vaporizes in use. Alternatively, the pumps 12 may be disposed downstream of a radiator-type or other heat exchanger assembly. The pumps 12 may also be disposed adjacent a heat exchanger unit 37' for mounting outside of the reservoir 14 as shown in FIG. 5. In this version, coolant from the reservoir 14 enters an inlet 51 of the heat exchanger unit 37' which routes the coolant through heat exchanger tubes 53 surrounding the pump 12. From the tubes 53, the coolant flows into the pump 12 and is discharged under pressure from an outlet 55 of the heat exchanger unit 37' for delivery to the manifold 30.

As shown in FIG. 2, each liquid pump 12 has a housing 40 with a tubular outer shell 42 with a pair of open ends one of which is rolled around a peripheral flange 44 of an outlet end cap 46 to retain the outlet end cap 46 and the other end of which is rolled around an upper edge 48 of an inlet end cap 50 to retain the inlet end cap 50. O-rings 51 or other suitable sealing members are preferably provided between the housing and each end cap 46, 50 to prevent leakage therebetween. An outlet passage 52 is formed in the outlet end cap 46 and preferably has an outlet fitting 54 received therein constructed to communicate through a flexible line 56 with the first manifold 30 to discharge liquid under pressure through the outlet passage 52 and into the manifold 30. The inlet end cap 50 has an inlet passage 58 through which liquid coolant is drawn into the pumping assembly 22. The pump 12 may be mounted within the reservoir 14 with a fluid conduit 60 communicating the inlet passage 58 with the coil 39 of the heat exchanger.

Figure 3:
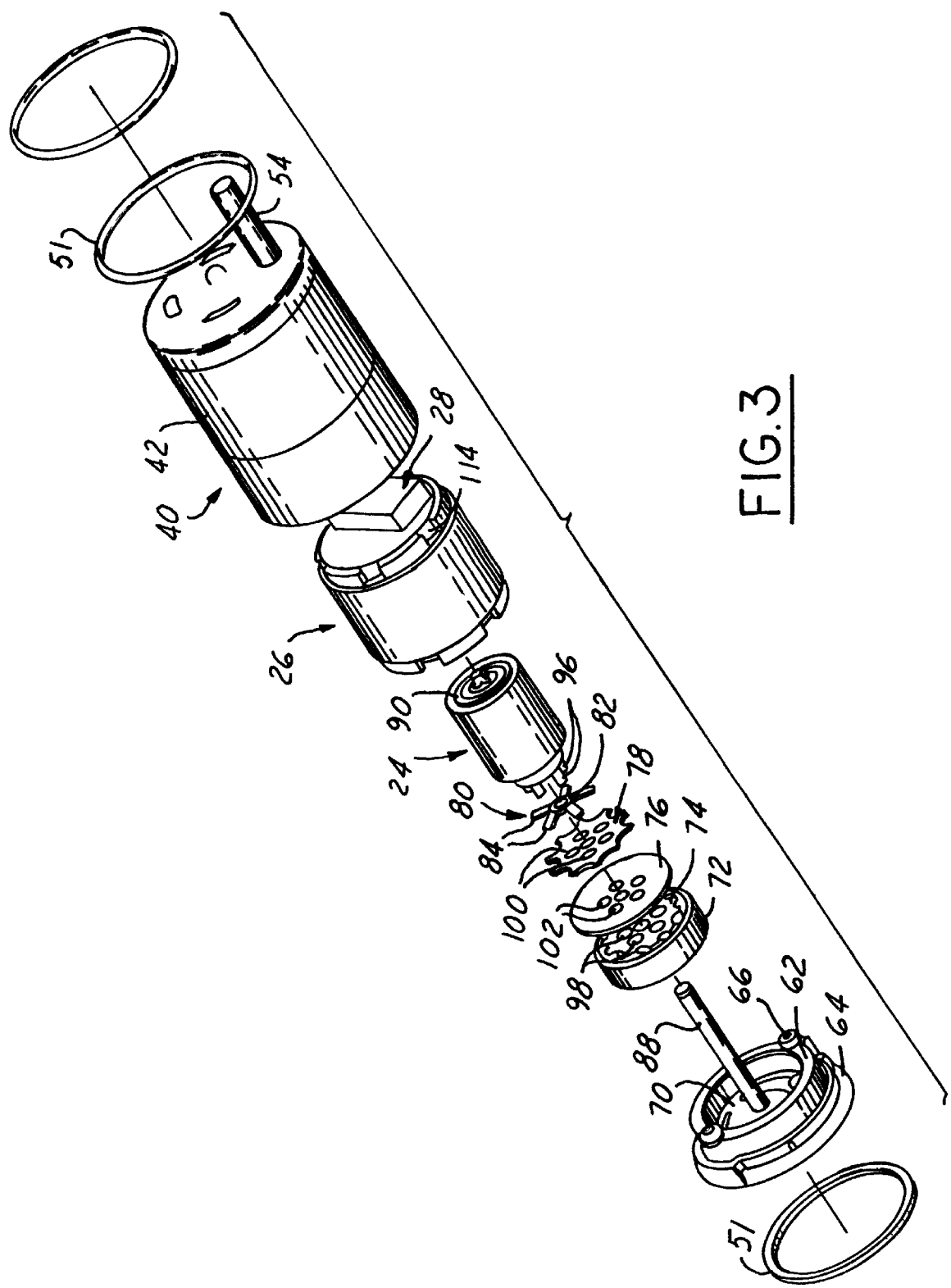
FIG. 3 is an exploded view of the coolant pump of FIG. 2.

As shown in FIGS. 2 and 3, the pumping assembly is preferably of the gear rotor type and has a retainer ring 62 connected to a carrier body 64 by a pair of screws 66 with a wear plate/inlet seal 68 received therebetween. They define a circular cavity 70 formed therein and constructed to receive an inner gear 74 intermeshed with an outer gear ring 72 with eccentric axes. The gears have a different number of teeth and are driven to rotate by the electric motor of the pump 12 to deliver coolant through enlarging and ensmalling chambers defined between the gears 72, 74. A flexible sealing disc 76 is disposed adjacent the downstream face of the gears 72, 74 and is held in place by a seal support 78 and a spider disc retainer 80 having a central portion 82 backed by the rotor assembly 24 and spaced spring legs 84 biasing the seal support 78 against the disc 76. The inner gear 74, disc 76, support 78, retainer 80 and the rotor assembly 24 are received and are journalled for rotation on a central shaft 88 fixed at one end to the gear carrier body 64. Alternatively, the pumps 12 may be of various other pump constructions such as the turbine vane type fuel pump disclosed in U.S. Pat. No. 5,219,277.

The rotor assembly 24 comprises permanent magnets 90 preferably encased or embedded in a bearing material such as carbon or sintered bronze and received within a cylindrical cavity 92 of the stator assembly 26 to rotate therein. The rotor 24 is operably connected to the inner gear 74 through a plurality of fingers 96 extending into recesses or openings 98 in the inner gear 74 for co-rotation of the inner gear 74 with the rotor assembly 24. As shown in FIG. 3, the fingers 96 extend through the retainer 80 between adjacent legs 84 and through aligned openings 100, 102 in the seal support 78 and the disc 76.

The stator assembly 26 is received within a tube 104 press fit onto the outlet end cap 46 and received adjacent to the shell 42. The stator assembly 26 has a metal, tubular outer casing 106 adjacent the tube 104 and defining an annular pocket 108 in which is received a layer of an insulating material 110 which is preferably formed of a polymer such as nylon or polyester. A plurality of electrical coils or stator windings 112 are wound on a stator core 113 of laminated plates of a ferromagnetic material such as steel which defines the cylindrical cavity 92 in which the rotor 24 is received. Preferably, there are six stator windings 112 and the rotor 24 has four magnetic poles. This asymmetry prevents all of the stator 26 and rotor 24 poles from being simultaneously aligned.

The electronic control circuit 28 is mounted on the stator assembly 26 with spaced notches or gaps 114 formed therebetween to permit fluid flow around the control circuit 28 and is preferably, but not necessarily, encapsulated with a coat of an epoxy so that it may be immersed in a wide range of liquids including various fuels, such as gasoline and diesel fuels. In various embodiments it may be desirable to coat the control circuit 28 as indicated with a suitable, thin dielectric coating to protect the control circuit while still permitting heat transfer away from the control circuit. In other applications, such as when the fluid pumped is a dielectric fluid, coating of the control circuit may not be desirable or necessary and an uncoated control circuit may be used. The control circuit 28 is electrically connected to each stator winding 112 to selectively energize or drive the windings 112 to provide a rotating magnetic field which rotates the rotor 24. The control circuit 28 is electrically connected to a terminal 116 attached adjacent the exterior of the outlet end cap 46 to supply an electric current to the control circuit and to energize the stator coils 112.

Figure 4:
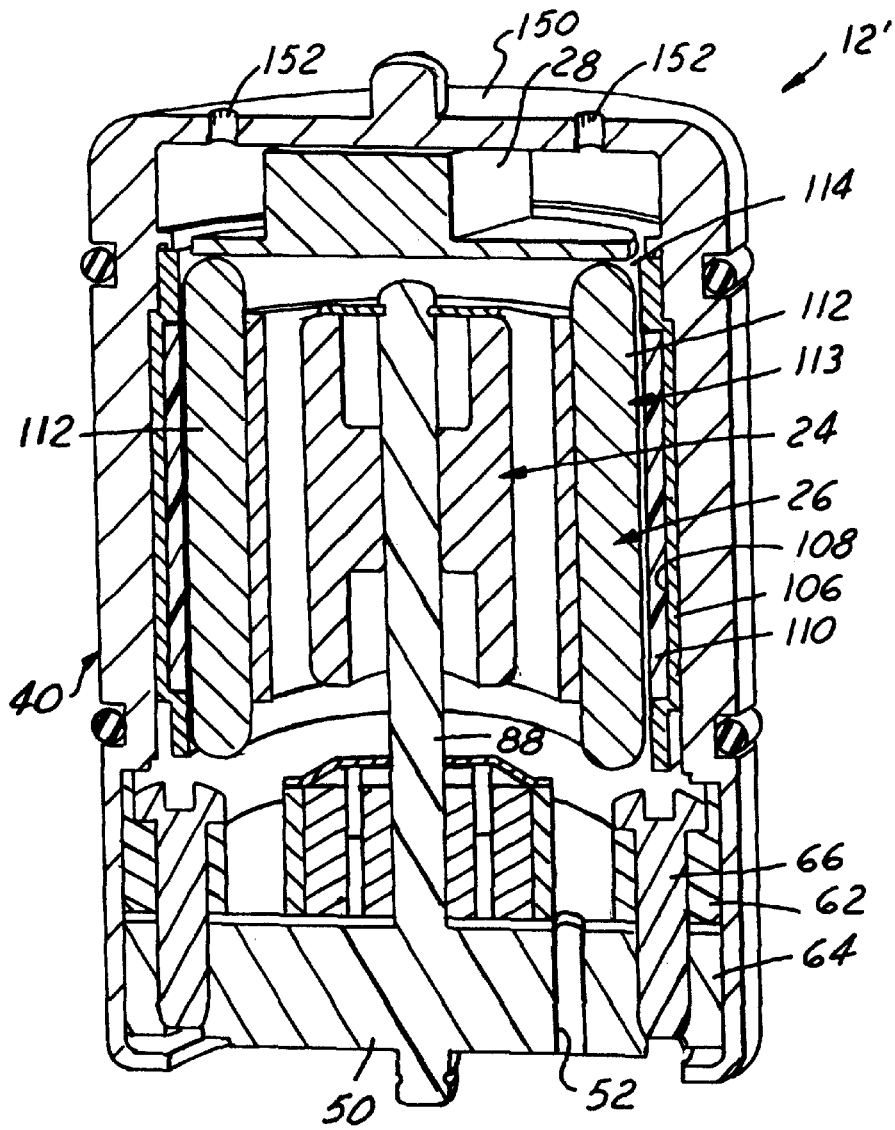
FIG. 4 is a cross sectional view of another embodiment of the coolant pump.

In a second embodiment, as shown in FIG. 4, the pump 12' may be mounted within or directly adjacent the manifold 30, having an O-ring or some other suitable seal to prevent fluid from leaking between the pump and manifold. The pump 12' is constructed in substantially the same manner as the first embodiment pump 12 with the exception that the outlet end cap 46 is replaced with an end cap 150 having one or more outlet openings 152 therethrough.

Operation

In use, an electric current is supplied to the terminal 116 and communicated therethrough with the control circuit 28 to cause the control circuit 28 to selectively sequentially energize the stator windings 112 to create the rotating magnetic field. The rotating magnetic field drives the magnetic rotor 24 for rotation to drive the inner gear 74 operably coupled with the rotor 24. The rotating inner gear 74 drives the outer gear 72 to create the enlarging and ensmalling chambers defined by the gears 72, 74 and draw the liquid coolant through the coil 39 and then into the inlet passage 58 and discharge it from the pumping assembly 22 under pressure. Coolant discharged from the gear rotor pumping assembly 22 travels up through the housing 40 between the rotor 24 and the stator 26 to cool the rotor 24, the stator 26 and the electronic control circuit 28 downstream of the rotor 24 and stator 26. Gaps 114 about the periphery of the electronic control circuit 28 permit the coolant to flow to the outlet passage 52 through which it is discharged to the first manifold 30. From the first manifold 30, the coolant flows to each of the supply manifolds 32 and thereafter through the atomizer plates 34 and associated nozzles 18 whereupon the coolant is sprayed onto the various electronic components 20 to cool them. Preferably, a thin film of coolant is maintained on the components 20 and at least some of the liquid coolant of the film vaporizes to more effectively cool the components due to the increased heat transfer from the components 20 to the liquid coolant associated with the phase change of the coolant. Also, the phase change of the coolant occurs at a generally constant temperature and thus, the temperature of the coolant film can be maintained generally constant to improve control over the cooling process.

Thus, the brushless coolant pump 12, 12' used in the cooling system 10 may be disposed directly in the coolant reservoir 14 or manifold 30 without providing any sealed enclosure of the pump or any component therein. Further, exposing the rotor 24, stator 26 and electronic control circuit 28 to the liquid coolant reduces their operating temperature to reduce the operating temperature of the pump 12, 12'. With the manifold assembly 16 the output of one or more pumps 12, 12' can be used to provide liquid cooling of a plurality of electronic components 20.

What is claimed is:

1. A system to cool a plurality of electronic components comprising:
   a reservoir containing a supply of a coolant;
   a pump having a brushless motor driving a pumping assembly constructed and arranged to draw the coolant from the reservoir into the pump and to discharge the coolant therefrom under pressure, the brushless motor having a stator, a rotor received in the stator and connected to the pump, and an annular space between the rotor and stator, an electronic control circuit electrically connected to the pump motor and responsive to a control signal to drive the motor and thereby drive the pumping assembly to discharge the coolant under pressure to flow through the annular space in direct contact with the stator and rotor and over the control circuit in contact therewith; and
   at least one manifold receiving the coolant under pressure downstream of the pump, stator, rotor, and control circuit and supplying the coolant under pressure to a plurality of outlets through which the coolant is discharged onto the electronic components.

2. The system of claim 1 wherein the pump is disposed within the reservoir and the reservoir defines a substantially sealed enclosure.

3. The system of claim 1 which also comprises a heat exchanger having an inlet in communication with the reservoir and an outlet in communication with the pump whereby the pump draws coolant from the reservoir through the heat exchanger and into the pump.

4. The system of claim 3 wherein the heat exchanger is disposed externally of the reservoir.

5. The system of claim 4 wherein the pump is disposed externally of the reservoir.

6. The system of claim 1 which also comprises a nozzle connected to each outlet to atomize liquid discharged therefrom and produce a liquid film on the electronic components to more evenly cool them.

7. The system of claim 1 which also comprises a second manifold upstream of the at least one manifold and having a plurality of outlets each communicating with a separate one of the at least one manifolds.

8. The system of claim 1 wherein the pumping assembly is a gear rotor type pumping assembly having a pair of intermeshing gears.

9. The system of claim 1 wherein the control circuit is at least partially coated with an epoxy material so that it is more durable when exposed to coolant.

10. The system of claim 1 wherein the pump has a stator with a plurality of stator windings, a permanent magnet rotor operably coupled to the pumping assembly and received in the stator between the stator windings and the control circuit is responsive to a control signal to selectively sequentially energize the stator windings and create a rotating magnetic field to rotate the rotor and drive the pumping assembly, and the rotor, stator and control circuit are each in contact with the coolant in the pump.

11. The system of claim 10 wherein the rotor comprises a plurality of permanent magnets providing at least four magnetic poles.

12. The system of claim 11 wherein the rotor magnets are encased in a polymeric material.

13. The system of claim 1 which also comprises a housing which carries the pumping assembly, the rotor, the stator windings and the control circuit with the rotor, stator windings and control circuit in fluid communication with the coolant discharged from the pumping assembly.

14. The system of claim 3 wherein the heat exchanger comprises a coil through which the coolant from the reservoir is drawn into the pump and a fan associated with the coil directs a forced air current onto the coil to cool the coil.

15. The system of claim 4 wherein the pump and the electronic components are disposed within the reservoir and the reservoir defines a substantially sealed enclosure.

16. A liquid pump comprising:
   a housing;
   a stator with plurality of stator windings received in the housing;
   a magnetic rotor received in the stator between the stator windings and with an annular space between the rotor and stator;
   a pumping assembly received in the housing and constructed and arranged to draw fluid therein and to discharge the fluid therefrom under pressure, the rotor being operably connected with the pumping assembly to drive it; and
   an electronic control circuit electrically connected to the stator windings and responsive to an electric current to selectively sequentially energize the stator windings and create a rotating magnetic field whereby the rotating magnetic field causes the rotor to rotate and drive the pumping assembly and the fluid discharged under pressure flows through the annular space in direct contact with both the rotor and stator and over the control circuit and in contact therewith.

17. The pump of claim 16 wherein the pump is disposed directly in a liquid reservoir.

18. The pump of claim 16 wherein the pumping assembly is a gear rotor type pumping assembly having a pair of intermeshing gears.

19. The pump of claim 16 wherein the control circuit is at least partially encapsulated in an epoxy material directly contacted by the fluid.

20. The pump of claim 16 wherein the rotor comprises a plurality of permanent magnets providing at least four magnetic poles.

21. The pump of claim 20 wherein the rotor magnets are encased in a polymeric material.

22. The pump of claim 16 which also comprises a shaft upon which the rotor and the pumping assembly are journalled for rotation.

23. The pump of claim 16 which also comprises a housing which carries the pumping assembly, the rotor, the stator windings and the control circuit with the rotor, stator windings and control circuit in fluid communication with the fluid discharged from the pumping assembly.

24. The pump of claim 16 wherein the fluid is a dielectric fluid.

25. The pump of claim 16 wherein the control circuit is coated with a dielectric material.

26. A liquid pump comprising:

a housing;

a stator with a plurality of stator windings received in the housing;

a magnetic rotor received in the stator between the stator windings;

a pumping assembly received in the housing and constructed and arranged to draw fluid therein and to discharge the fluid therefrom under pressure, the rotor being operably connected with the pumping assembly to drive it;

an electronic control circuit electrically to the stator windings and responsive to an electric current to selectively sequentially energize the stator windings and create a rotating magnetic field whereby the rotating magnetic field causes the rotor to rotate and drive the pumping assembly and the rotor, stator and control circuit are each in contact with the fluid in the housing; and wherein the fluid is dielectric fluid and the control circuit is uncoated and is in direct contact with the dielectric fluid.

* * * * *